UNITED STATES PATENT OFFICE.

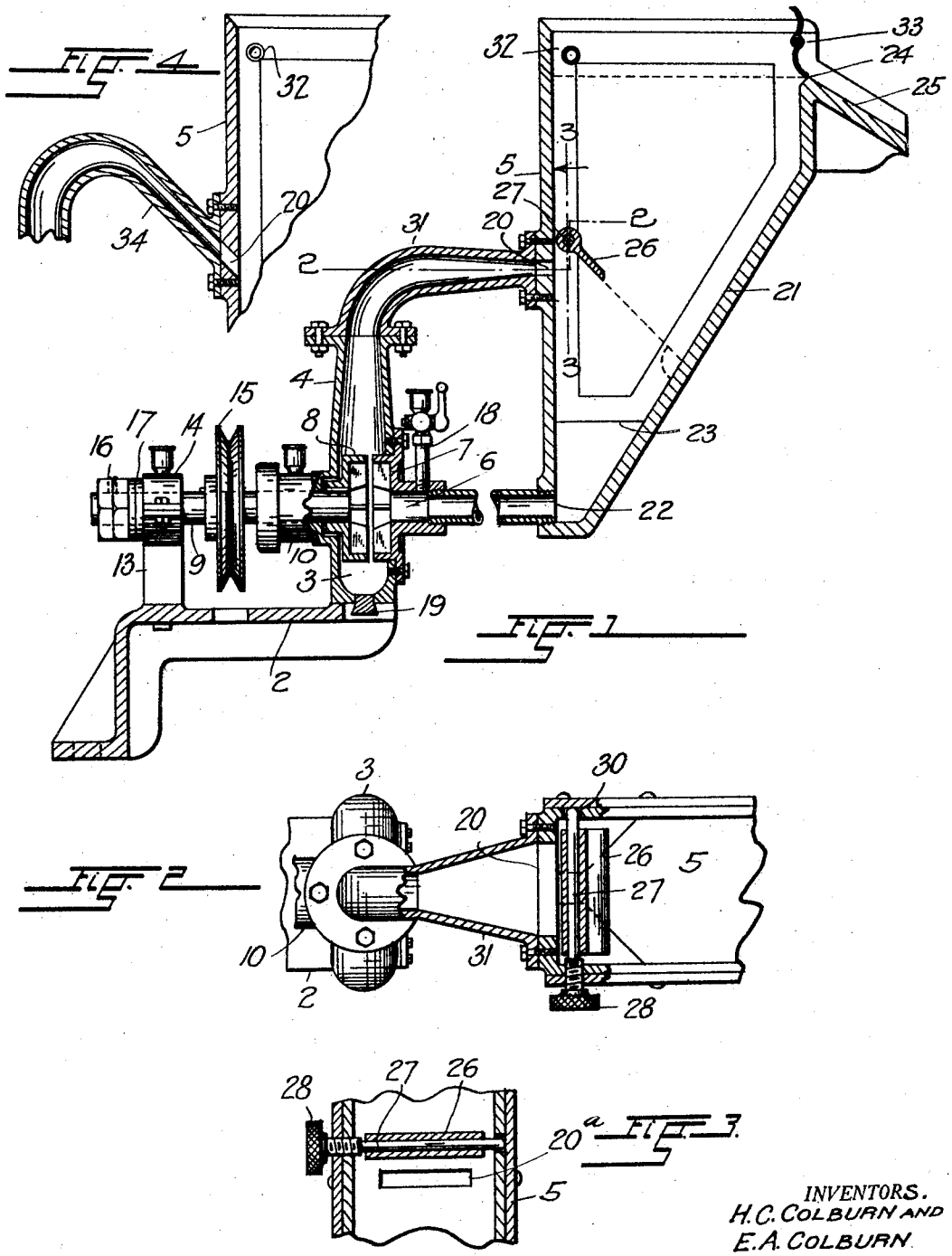

HERBERT C. COLBURN AND ERNEST A. COLBURN, OF DENVER, COLORADO, ASSIGNORS TO THE COLBURN FLOTATION & ENGINEERING COMPANY, OF DENVER, COLORADO, A CORPORATION OF COLORADO.

APPARATUS FOR THE SEPARATION OF ORES BY FLOTATION.

1,415,314. Specification of Letters Patent. Patented May 9, 1922.

Application filed January 3, 1919. Serial No. 269,517.

*To all whom it may concern:*

Be it known that we, HERBERT C. COLBURN and ERNEST A. COLBURN, citizens of the United States, residing at Denver, in the county of Denver and State of Colorado, have invented certain new and useful Improvements in Apparatus for the Separation of Ores by Flotation, of which the following is a specification.

The invention relates to an apparatus for the separation of ores by flotation.

The object of the present invention is to provide an improved apparatus of simple and comparatively inexpensive construction adapted to separate ore by flotation in an economical and highly effective manner.

The apparatus herein referred to is adapted to subject ore-pulp to agitation and the scouring action under a partial vacuum and then introduce the same in a downwardly directed current of sheet-like form beneath the surface of a liquid to cause the separation of those of its particles which by their buoyancy rise to the surface from those which settle to the bottom of the vessel in which the liquid is contained.

The agitating and scouring actions to which the material is subjected by the apparatus, bare and brighten its metallic particles to prevent their being water wetted. Its silicious worthless constituents are at the same time saturated with the water of the pulp, and the air contained in the material is finely disseminated to aid in the subsequent separating step of the process without undue and deterimental disturbance of the liquid body into which the product of the mixing and scouring actions is introduced.

It will thus be seen that an apparatus comprises two essential cooperative elements, to-wit: a mixing and scouring contrivance and a settling or subsidence vessel provided with means for the production of a downwardly directed current of material in sheet-like form and the resultant separation of the buoyant particles from the water-wetted gangue.

This application concerns only the separating element of the apparatus, the mixing element of the same having been made the subject of a separate application for patent Serial Number 269,518 filed January third, 1919.

An embodiment of our invention in what at present we consider its preferred form, has been shown in the accompanying drawings in the various views of which similar reference characters designate corresponding parts and in which, Figure 1 represents a section in vetical elevation of the apparatus;

Figure 2, a horizontal fragmentary section taken on the line 2—2, Figure 1,

Figure 3, a fragmentary vertical section on the line 3—3, Figure 1, looking in the direction of the arrow drawn across said line, and Figure 4, a fragmentary section showing a modified means for admitting the ore pulp to the settling chamber of the apparatus in a downwardly directed current.

Referring more specifically to the drawings, the reference character 2 designates a base of suitable construction for the support of the mixing element of the apparatus which comprises a partially cylindrical casing 3 having a central, upwardly extending nozzle 4 of tapering form for its connection with the inlet-opening of the subsidence vessel 5 hereinafter to be described.

The casing has in one of its sides a central feed-opening 6 and surrounding the same, the stationary member 7 of an agitator which effects the intimate mixture of the material within the casing.

The two members of which the agitator is composed each consist of a plurality of radiating blades within a circular rim. The stationary member 7 adjoins the wall of the casing around its feed-opening, and the other member 8 is mounted in axial alinement therewith upon the end of a rotary shaft 9 which extends through a packing box 10 on the opposite wall of the casing.

A standard 13 erected on the base, carries a pillow-box 14 for the support of the shaft exteriorly of the casing and a pulley 15 mounted on the shaft between the standard and the stuffing box of the casing, provides for its connection with a motor or other source of mechanical energy.

The end thrust of the shaft is controlled by a pair of nuts screwed upon its extremity and acting upon resilient thrust washers 17 which engage the outer end of the pillow box. By adjustment of the nuts on the shaft, the distance between the members of the mixer may be regulated to vary the degree of the vacuum produced in the casing during rotation of the shaft.

A valve-controlled conduit 18 connects with an opening adjacent the inlet of the casing for the introduction of air if required, and for the supply of oil or other suitable selective agent.

A partial vacuum is produced in the casing during rotation of the moving member of the agitator, owing to the difference in area between its inlet and outlet openings, it having been found that a proportion of 1 to 4 between the area of the inlet opening and that of the outlet opening has produced most satisfactory results.

A removable plug 19 in the bottom of the casing is provided for cleaning purposes.

The subsidence vessel 5 of the apparatus is preferably made in the form of a spitzkasten which in one of its sides has a slot-like, horizontally extending intake-opening 20 and opposite thereto a deflecting surface 21 which slants toward an outlet 22 in the bottom of the same.

The end walls of the spitzkasten converge at their lower ends as at 23 to assist in directing the settling matter toward the discharge opening.

The subsidence vessel has at the upper end of its side opposite to that which has the inlet slot, an overflow 24 which delivers onto a slanting apron 25 for the discharge of matter floating upon the surface of a liquid contained in the vessel.

A baffle-plate 26 projects slantingly over the intake slot of the spitzkasten to compel the inflowing material to assume a downward direction toward the opposite slanting surface 21.

The baffle-plate is mounted upon a shaft 27 which at one of its ends has a screw-thread to cooperate with a threaded opening in one of the end-walls of the settling vessel and which at its opposite end extends into a socket 30 in the opposite wall of the same to frictionally engage the end thereof.

A milled head 28 at the threaded end of the shaft facilitates its rotation for the purpose of adjusting the angle of the plate 26 with relation to the opposite deflective surface.

The angle between the plane of the working surface of the baffle and the slanting surface of the vessel may thus be varied in accordance with the requirements of the particular material under treatment, it having been found that different kinds of ores require current flows at different angles to produce the desired separation of its buoyant and settling particles at or adjacent the point at which they enter the spitzkasten.

It is desirable, however, that the angle between the plane defined by the lower surface of the baffle and the deflective surface 21, below the plane, should be obtuse whereby to produce a downward current of the settling material toward the outlet opening at the bottom of the subsidence vessel.

The tapering nozzle of the casing of the mixing element of the apparatus is connected with the intake slot of the subsidence vessel by an elbow 31 which is contracted and widened at its outer end to conform with the slot with which it connects.

In the operation of the apparatus, the material enters the casing of the mixing element through the opening 6 and is violently agitated by the rotating movement of the member 8 opposite the correspondingly formed stationary member 7.

The rotary motion of the member produces a partial vacuum in the casing owing to the difference in the area of the intake-opening and that of the inlet opening as hereinbefore explained, and the reduced air-pressure causes the expansion and subsequent rupture of the colloidal envelopes of the metallic ore particles and the atomization and dissemination of the air naturally contained in the material.

Although a large quantity of air is not required in the performance of our process and may even be detrimental to its separative action, it is at times advantageous to add a small quantity of air to that originally contained in the material, in which case the valve controlling the flow through the pipe 18 connected with the inlet of the casing is opened to the required degree.

An oil or other contaminating material may also be added through the same pipe or it may be mixed with the material before it enters the casing or after it has entered the settling vessel, it being more the purpose of this agent to lower the surface tension on the level of the liquid in the vessel than to increase the buoyancy of the valuable particles ascending thereonto.

When an oil is added to the material before or during agitation, the operation of the mixing element produces an intimately mixed condition of the ore and the oil, which is advantageous in effecting a rapid and clean separation of the minerals from the gangue in the next step of the process.

The material with its mineral particles in a bared and scoured condition and its silicious gangue wetted with water, enters the settling vessel in sheet-like form through the slot-like opening 20, intermixed with the air in a finely divided condition.

The baffle extending over the opening causes the entering matter to assume a downwardly slanting current which impinges on the opposite deflective surface 21.

Immediately after leaving the surface of the baffle the material is being separated into two classes, namely, the water-wetted gangue which sinks in the liquid and the bared and polished metallic particles which aided by the finely divided air and oil, rise to the surface of the liquid determined by the overflow.

The separative action is completed by the impact of the inflowing current upon the slanting surface and the settling gangue is discharged from the vessel through the outlet 22 which is preferably connected with the mixing element of a second similar apparatus for a repeated treatment.

The valuable matter congregates at the surface of the liquid in a film or a froth where it remains wetted particles of extraneous matter which ascended with the values, sink to the bottom of the vessel.

In this connection it will be observed that owing to the downward movement of the current of material entering the settling vessel through the opening 20, and the absence of large quantities of air, disturbance of the liquid at its surface is prevented, which thereby remains constantly in a condition to hold the mineral particles in suspension by the forces hereinabove referred to.

The metallic particles supported on the surface of the liquid are removed across the overflow, preferably by the passage of a gentle air current through a perforated pipe 32 aided if necessary by a mechanical skimmer 33 of suitable construction.

The contaminating agent which was introduced into the material either before it entered the mixing element or after it was admitted to the settling vessel, is effective in lowering the surface tension on the level of the liquid to the extent that the ascending mineral particles are brought in sufficient nearness to the liquid surface to permit of their remaining in a floating condition.

In the operation of the apparatus, a sheet of oleous matter extends constantly across the vessel in the plane of the lower surface of the baffle and this partitioning sheet intercepts descending values which failed to reach the surface of the liquid and arrests their further downward movement until they are again carried upwardly by ascending currents of fresh material.

While we prefer the use of a baffle-plate over the intake-opening of the settling vessel to compel the entering material to move in a downward direction, the same result may be obtained by slanting the conduit which connects the opening with the nozzle of the mixing element, as shown in Figure 4 of the drawings, in which the reference character 34 designates the slanting end portion of the elbow which connects the nozzle 4 with the slot 20ª which in this instance has its longitudinal edges slanted continuously with the interior surface of the adjoining portion of the elbow.

Having thus described our invention what we claim and desire to secure by Letters-Patent is:

1. The combination of a settling chamber having an inclined surface and provided with an inlet opening located opposite the said surface and beneath a predetermined liquid level and arranged to discharge in the direction of the inclined surface, a mixing chamber, means for introducing the material from the mixing chamber into the settling chamber in sheet like form, a vertically angularly adjustable baffle arranged within the settling chamber in position overhanging the inlet opening for directing the said material towards the inclined surface of the settling chamber, and means for returning the settling material to the mixing chamber.

2. The combination of a settling chamber having an inclined surface provided with an inlet opening located opposite the said surface and beneath a predetermined liquid level and arranged to discharge in the direction of the inclined surface, a mixing chamber, means for introducing the material from the mixing chamber into the settling chamber in sheet-like form and a vertically angularly adjustable baffle arranged within the settling chamber in position overhanging the inlet opening for directing the said material toward the inclined surface of the settling chamber.

3. The combination of a settling chamber having an inclined surface and provided with an inlet opening located below the said surface and beneath a predetermined liquid level and arranged to discharge in the direction of the said inclined surface, a mixing chamber and a vertically angularly adjustable baffle arranged within the settling chamber in position overhanging the inlet opening for directing the said material towards the inclined surface of the settling chamber.

4. The combination of a settling chamber having an inlet opening in one wall, the opposite wall being inclined and forming a tapering chamber, said settling chamber being also provided at the bottom with a lower opening located adjacent the lower end of the said inclined wall, a casing forming a mixing chamber and provided with an upwardly extending outlet having an approximately horizontal tapering nozzle adapted to discharge the material in sheet like form through the inlet opening in the direction of the upper portion of the inclined surface, a substantially horizontal return pipe connected with the lower opening for returning the settled material to the said casing, means operating within the casing for forcing the material through the nozzle, and a valve controlled conduit connected with the horizontal return pipe for the introduction of air or a selective agent.

In testimony whereof we have affixed our signatures.

HERBERT C. COLBURN.
ERNEST A. COLBURN.